United States Patent [19]
Stark et al.

[11] Patent Number: 5,488,812
[45] Date of Patent: Feb. 6, 1996

[54] PACKAGING MACHINE

[75] Inventors: Olof Stark, Ystad; Gunnar Drevfors, Åkarp, both of Sweden

[73] Assignee: Tetra Laval Holdings & Finance, Pully, Switzerland

[21] Appl. No.: 190,546

[22] Filed: Feb. 2, 1994

[30] Foreign Application Priority Data

Feb. 17, 1993 [SE] Sweden ................................ 9300524

[51] Int. Cl.$^6$ .............................. B65B 1/00; B65B 3/00; B65B 5/00; B65B 43/26
[52] U.S. Cl. ................ 53/266.1; 53/565; 53/467; 53/458; 493/125; 493/135; 493/183; 493/182
[58] Field of Search .............................. 53/55, 565, 202, 53/467, 458, 381.1, 201; 493/123, 125, 133, 135, 183, 182

[56] References Cited

U.S. PATENT DOCUMENTS

| | | | |
|---|---|---|---|
| 2,757,498 | 4/1955 | Meyer-Jagenberg et al. | 53/186 |
| 3,017,731 | 3/1960 | Lohse | 53/201 |
| 3,258,893 | 7/1966 | Jones | 493/125 |
| 4,566,251 | 1/1986 | Spisak et al. | 53/202 |
| 4,566,251 | 1/1986 | Spisak et al. | 53/167 |
| 4,588,391 | 5/1986 | Evans et al. | 493/182 |
| 4,790,123 | 12/1988 | Ljungström et al. | 53/458 |
| 4,807,420 | 2/1989 | Barker | 53/550 |
| 4,860,519 | 8/1989 | Lemaire et al. | 53/167 |
| 4,982,556 | 1/1991 | Tisma | 53/506 |

FOREIGN PATENT DOCUMENTS 678935  11/1991  Switzerland.

Primary Examiner—John Sipos
Assistant Examiner—Rodney Butler
Attorney, Agent, or Firm—Burns, Doane, Swecker & Mathis

[57] ABSTRACT

A packaging machine for manufacturing packaging containers for liquid contents, e.g., milk or juice, from tubular packaging container blanks of laminated paper and plastic material. The blanks are fed through the machine by means of a main conveyor along which is disposed various stations for performing operations such as sealing the bottom ends of the blanks to form bottom-sealed packaging containers, filling the bottom-sealed packaging containers, and top-sealing the filled containers. A station can also be provided to transfer blanks from an infeed conveyor located below the main convey to the main conveyor. The stations are jointly controlled but individually driven and replaceable, which makes for a flexible and compact machine.

13 Claims, 7 Drawing Sheets

5,488,812

PACKAGING MACHINE

FIELD OF THE INVENTION

The present invention relates to a manufacturing machine and more particularly to a machine for manufacturing filled and sealed packaging containers, comprising an endless conveyor and workstations disposed therealong.

BACKGROUND OF THE INVENTION

Trends within the field of packaging machines point towards increasingly high capacity machines intended for rapid, continuous production of a very large number of identical or similar packaging containers, e.g. such as are intended for liquid contents such as milk, juice and the like. However, even though the various functions of such packaging machines are greatly integrated with a view to restricting the size of the machines, the space requirements continue to grow. The state-of-the-art generation of high capacity filling machines for, for example, milk, are of such size that, for reasons of space, they that are often incapable of replacing an older machine of lower capacity but instead require as much space as two such prior art models. In addition, from the point of view of capacity, two slower machines may occasionally be comparable with a single modern high capacity machine and, moreover, afford a higher degree of flexibility when it comes to the simultaneous manufacture of packaging containers of different sizes or types, or packaging containers which are to be filled with different types of liquid contents.

Many of the prior art packaging machines which are currently in operation on the market manufacture single-use disposable packages of laminated, plastic-coated fiber material which, in the form of flat-laid blanks, is fed to a magazine in the packaging machine. Each packaging container blank is transferred from the magazine to a mandrel which serves as backup counterface when the one end of the packaging container blank is folded down and heat-sealed for forming a liquid-tight bottom in the packaging container. The blank is then placed in a conveyor which is advanced stepwise so that the blank passes stations for top-forming, filling and top-sealing, whereafter (possibly after final forming) it is discharged from the packaging machine in the form of a filled and sealed packaging container. The stepwise advancement in the transport sequence is restricted—in both frequency and speed—by the fact that the packaging containers which are located between the filling station and the top-sealing station are filled with their liquid contents, which may easily be set in motion and slop over the upper, open end of the packaging container if the indexing in the transport sequence becomes too rapid or jerky.

A further drawback inherent in prior art machines of the above-outlined type is that they are exclusively intended for the manufacture of packaging containers of one type—and moreover are often limited such that they can only produce the selected type of packaging container in a single size. Even if it were theoretically possible, by replacing and rebuilding certain parts of the packaging machine, to manufacture packaging containers of, for example, a different top design configuration, this often defies ready technical application without extensive retrointervention in the packaging machine, since the various parts of the machine are not only integrated with one another to a considerable extent, but are also driven by a common prime mover or power source by the intermediary, for example, of one drive shaft with a number of cam surfaces.

It will be apparent from the foregoing discussion that it is a general wish within the art to devise a packaging machine for manufacturing packaging containers for liquid contents which in itself combines the three properties of high capacity, slight space requirements and extreme versatility. Naturally, account must also be taken of a number of other factors of well-known type, for example the overall capital costs of the machine, serviceability, operational reliability and demands on standards of hygiene.

OBJECTS OF THE INVENTION

One object of the present invention is to devise a packaging machine which, despite its extremely high workrate, is of compact outer dimensions and may, as a result, even be installed in cramped spaces.

A further object of the present invention is to devise a skeletal packaging machine which is extremely flexible and, by simple and rapid replacement of vital parts, may be employed for the production of packaging containers of various types, for example, packaging containers with different types of end seals, closures or end walls.

Yet a further object of the present invention is to devise a packaging machine which is particularly well suited for rapid production of filled and sealed packaging containers, for low-viscosity contents such as milk.

Still a further object of the present invention is to devise a packaging machine which is simultaneously capable while in operation of filling the produced packaging containers with different types of contents.

SOLUTION

These and other objects have been attained according to the invention in that a machine of the type mentioned by way of introduction has two or more workstations in the form of replaceable machine modules. Each one of these modules may be driven by one associated prime mover or power source, and the prime movers of the different modules are controlled by a common control unit.

BRIEF DESCRIPTION OF THE ACCOMPANYING DRAWINGS

One preferred embodiment of the packaging machine according to the present invention will now be described in greater detail hereinbelow, with particular reference to the accompanying, schematic Drawings which show only those details and parts essential to an understanding of the invention. In the accompanying Drawings.

DESCRIPTION OF PREFERRED EMBODIMENT

Figure 1:
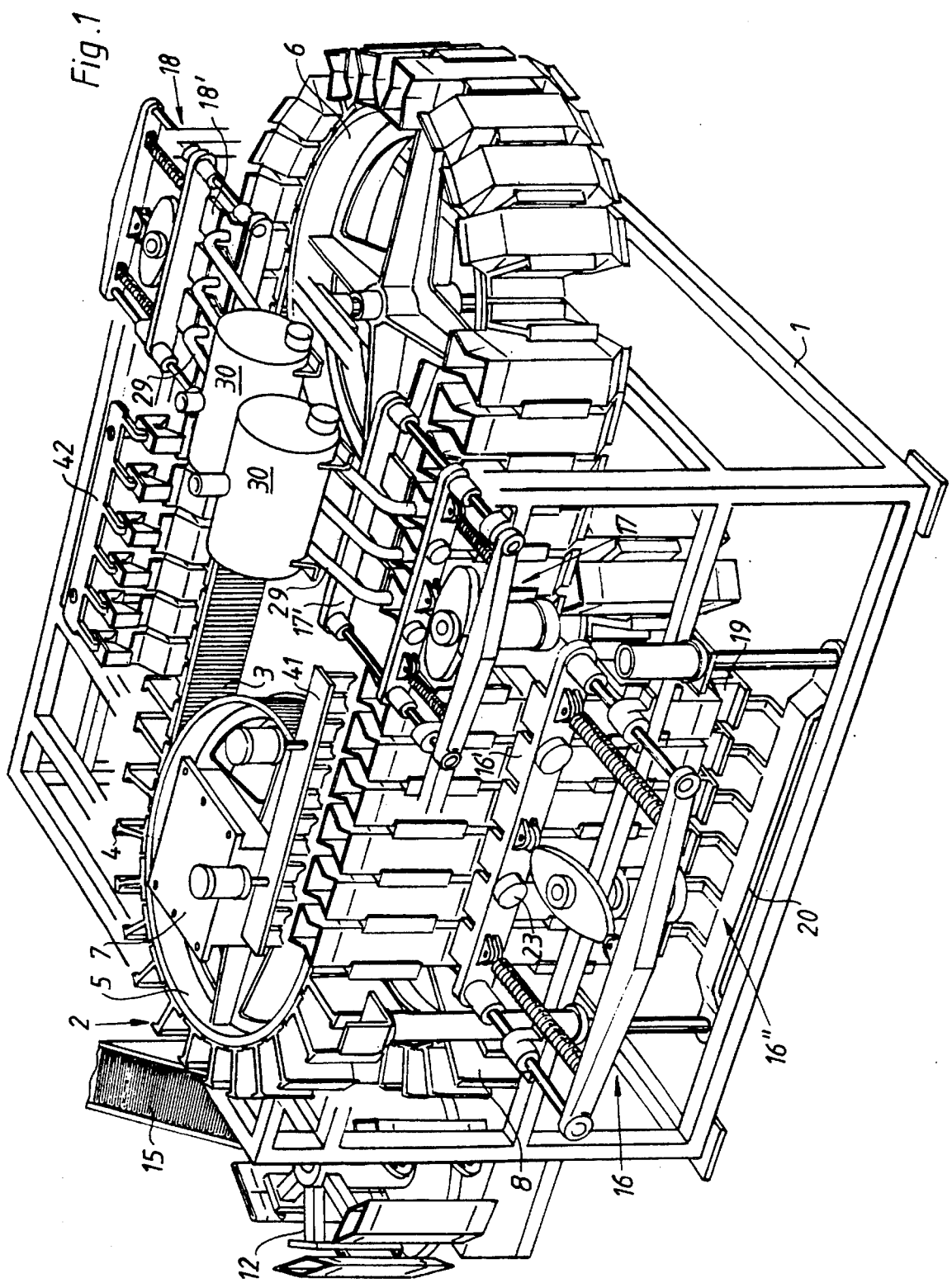
FIG. 1 is a perspective view of the major parts of the packaging machine with the protective cladding and other obstructive elements of the machine having been removed.

It will be apparent from the figures how the main parts of the packaging machine are placed in a frame I which is, in a known manner, constructed from square tubes so as to support and positionally fix the main parts included in the machine in relation to one another. For purposes of better clarity of the Drawings, all surrounding, per se known machine parts have been removed, as well as those cladding plates and hatches which normally cover both the frame and the majority of the machine parts carried by the frame. In the finished state, the packaging machine according to the invention thus comprises not only the parts visible in the Drawing figures, but also per se known electric and pneumatic equipment, connection conduits therefor, drive means, guiding devices and an outer casing in the form of covering plates, hoods, hatches and doors. However, these details do not necessitate illustration or detailed presentation, since they are not germane to the present invention as such, nor do they influence the construction or operating principle of the machine proper.

The frame illustrated in FIG. 1 carries a main conveyor 2 extending in the longitudinal direction of the machine and comprising an endless conveyor belt 3 which is provided with uniformly spaced projecting, T-shaped carriers 4 forming compartments therebetween for accommodating the packaging container blanks, whose quadratic cross section substantially corresponds to the equivalent dimensions of the compartments. The conveyor belt 3 runs horizontally between two wheels 5 and 6, of which the one is driven by an electric motor 7 which is placed above the wheel 5 and fixedly secured in the frame 1.

Figure 2:
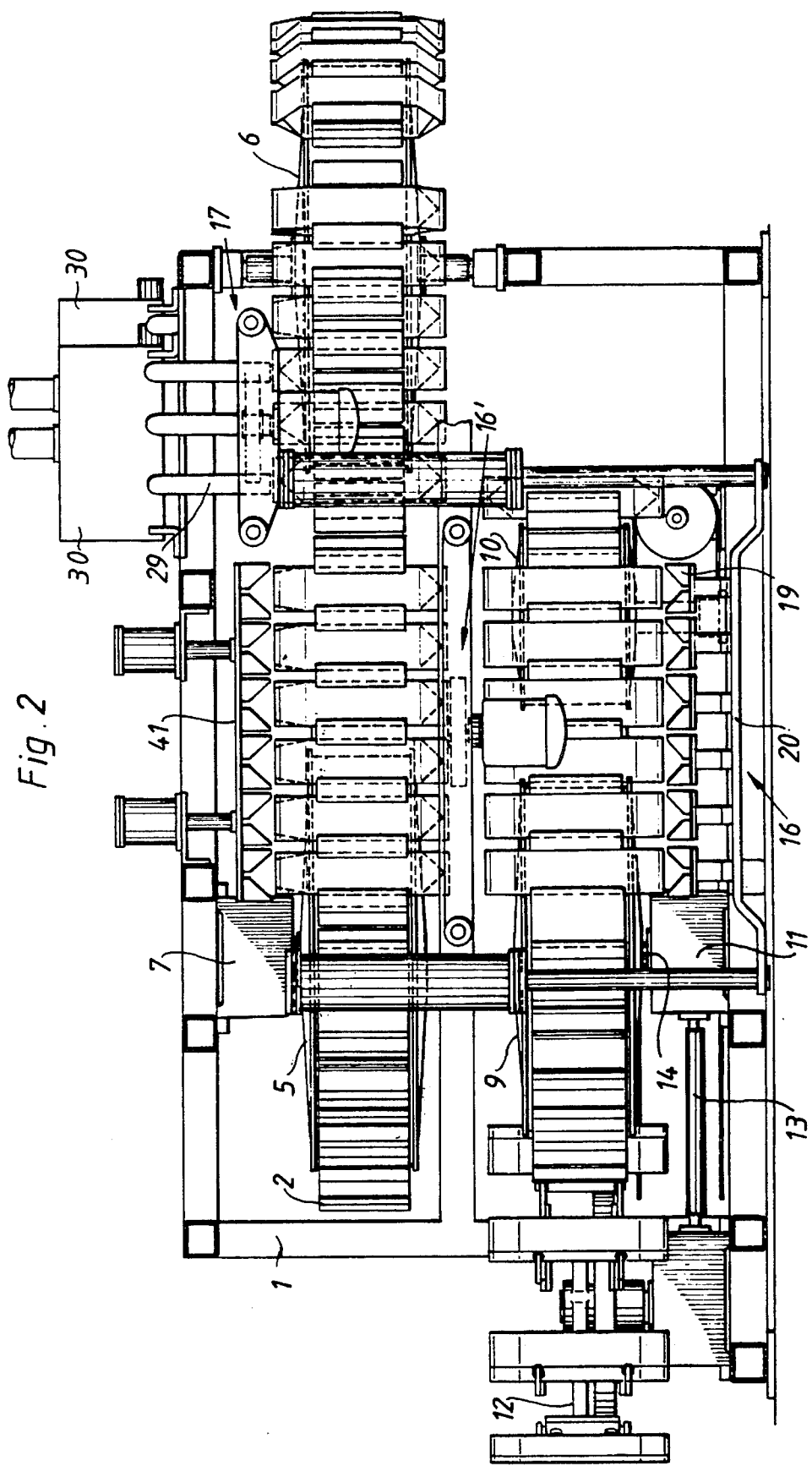
FIG. 2 is a side elevation of the skeletal structure of the machine of FIG. 1.
Figure 5:
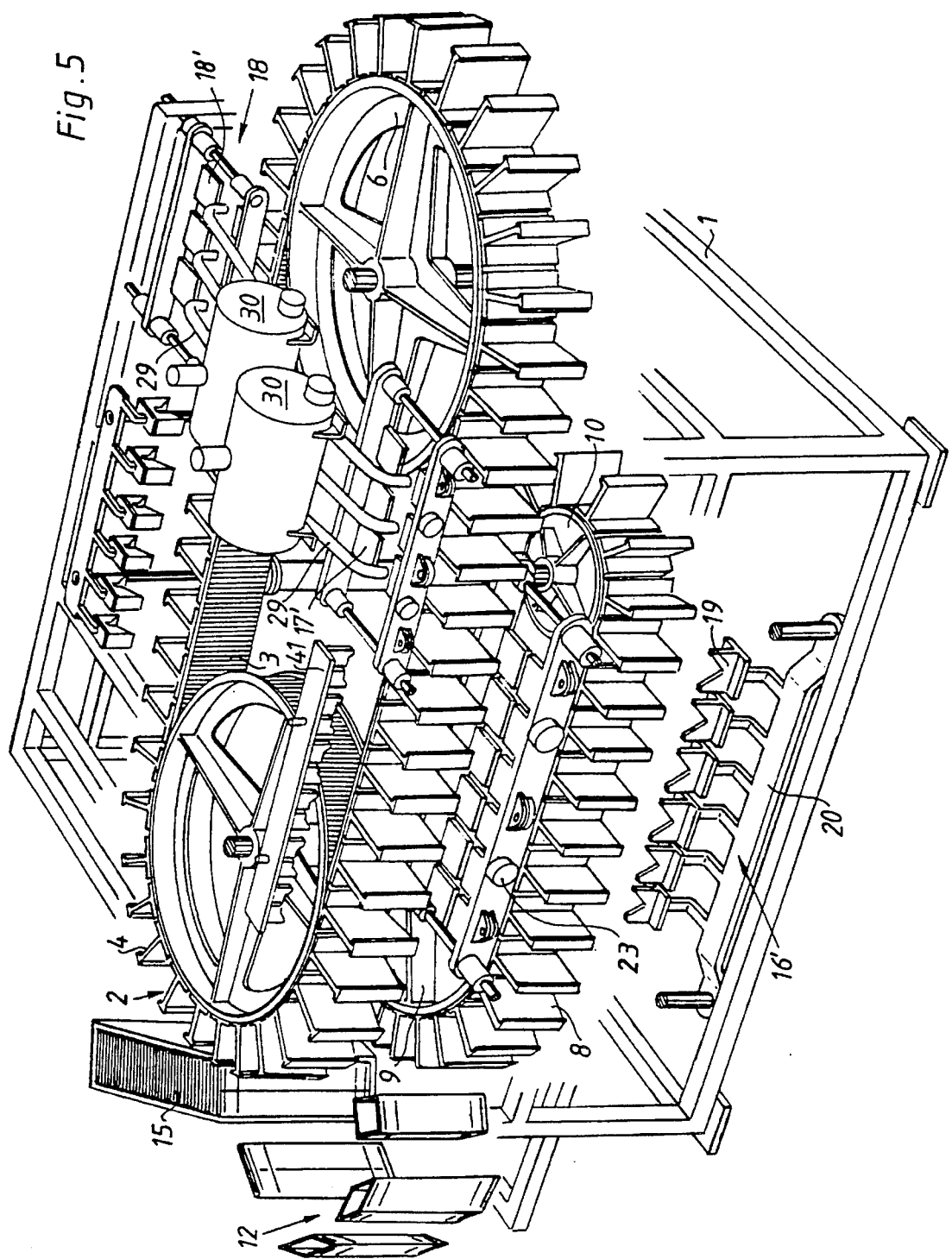
FIG. 5 is a perspective view similar to that of FIG. 1 and illustrates the transport and processing of packaging containers.

Immediately beneath the main conveyor 2, there is an infeed conveyor 8 which likewise extends horizontally between two wheels 9 and 10, one of which is driven by an electric motor 11 (FIG. 2). The wheel 10 is disposed substantially at the central region of the machine, and so the infeed conveyor 8 is of a length which only amounts to roughly half of the length of the main conveyor 2. The infeed conveyor 8 is also provided with carriers and is thus divided into compartments for accommodating the individual packaging containers, as is apparent from FIGS. 3 and 5.

Immediately adjacent the one end of the infeed conveyor, an infeed wheel 12 is disposed at the infeed end of the machine, this wheel being drivably connected via a gearbox and a shaft 13 with the drive shaft 14 of the motor 11. The infeed wheel 12 displays a number of devices entraining the packaging containers, these devices being disposed, during simultaneous reforming of the packaging container blanks, to transfer them from a magazine 15 to the infeed conveyor 8. This part of the packaging machine according to the present invention is shown and described in detail in European Patent Application No. 90311570.7, to which reference is now made, and will not, therefore, be described in greater detail in this context.

Figure 3:
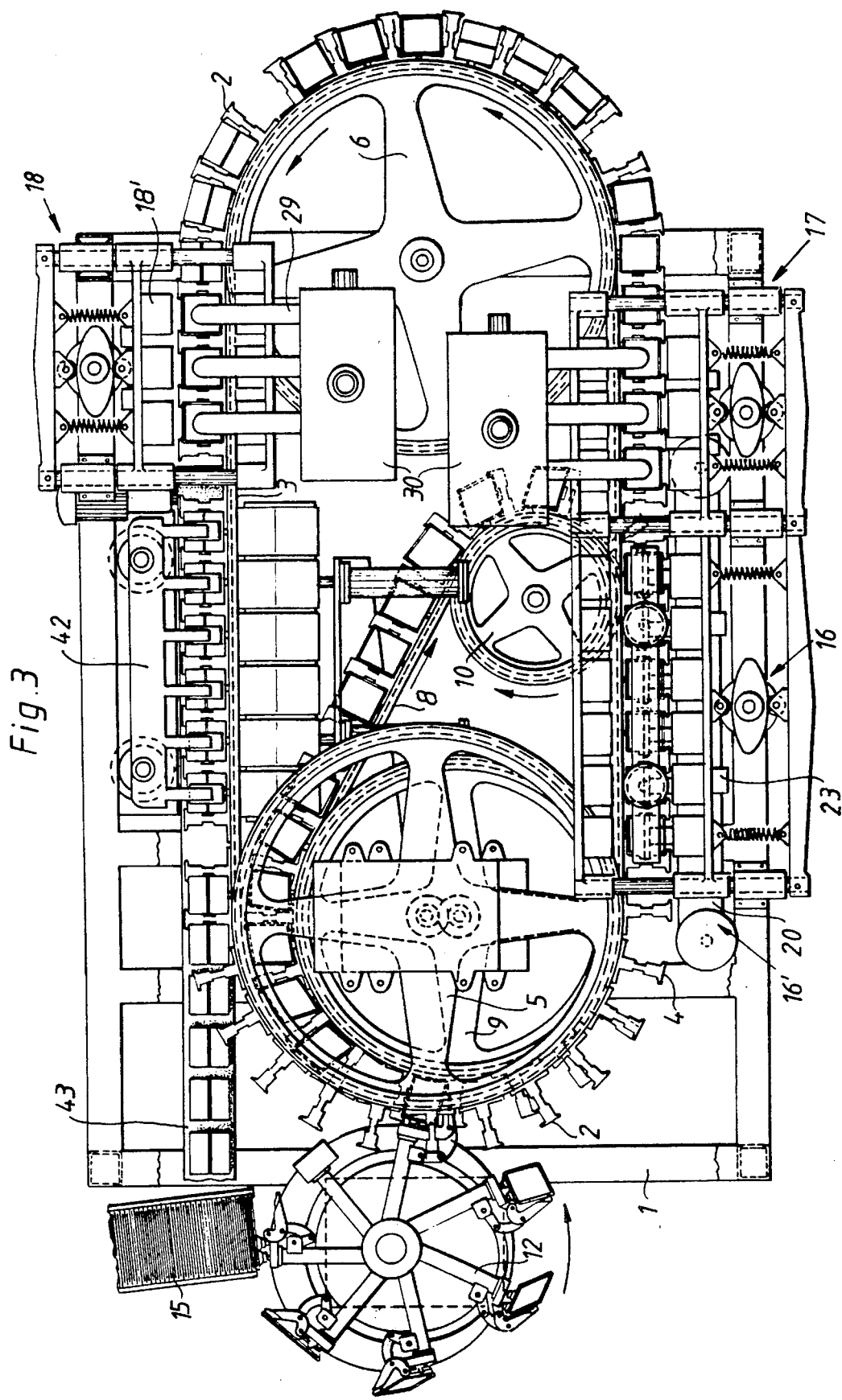
FIG. 3 is a top plan view of the skeletal structure of the machine of FIG. 1.

While in operation, the conveyor belt 3 of the main conveyor 2 is disposed to move in a counterclockwise direction (FIG. 3). Seen in the direction of movement, there is first disposed along the first part of the conveyor belt 3 a workstation 16 with a bottom sealing portion 16' which is mounted in the frame 1 at a level slightly beneath the lower edge of the conveyor belt 3, and is disposed to process the bottom, i.e. that momentarily lower end of a group of packaging container blanks disposed in the compartments of the conveyor belt 3.

A slight distance after the workstation 16, there is a second workstation 17 disposed along the first part of the conveyor belt 3, this station including a top-sealing portion 17' which is located slightly higher than the workstation 16 and, more precisely, somewhat above the upper edge of the conveyor belt 3. The top-sealing portion 17' is intended to process the upper end of the packaging container blanks located in the compartments of the conveyor 2. After the wheel 6, seen in the direction of movement of the conveyor belt 3, there is an additional workstation 18 along the return part of the conveyor belt, this station being substantially identical with the workstation 17 and, like this latter, having its top-sealing portion 18' located at the upper edge of the conveyor belt 3. In the illustrated, preferred embodiment of the packaging machine according to the invention, the workstation 16 is intended simultaneously to process a group of packaging containers which comprises six individual such packaging containers, while each one of the workstations 17 and 18 is intended to process a sub-group each containing three of the packaging containers included in the previously mentioned group. This implies that the return part of the conveyor belt 3 is also utilized in an optimum manner, with the result that the machine can be made more compact. In addition to the operating principle of the machine as a whole, this will be described in greater detail hereinbelow.

The first workstation 16 also comprises, in addition to the bottom sealing portion 16', a transfer portion 16" which is intended on the one hand to transfer six packaging container blanks at a time from the lower conveyor or infeed conveyor 8 vertically upwards to the compartments of the conveyor belt 3 formed by the carriers 4. When the packaging containers have been placed in the compartments, their momentarily lower ends are subject, in the first bottom sealing portion 16', to a forming and sealing operation, these lower ends being hereafter designated the bottom ends of the packaging containers for the sake of simplicity. The vertical transfer of the packaging container blanks is effected in the transfer portion 16" with the aid of a transfer bridge 20 which comprises a group of V-shaped lifting devices 19 which are fixedly connected to one another in a row extending along the underside of the infeed conveyor 8. The transfer portion 16" also includes drive means (not shown) in the form of a pneumatic cylinder or an electric motor, making it possible to displace the transfer bridge 20 vertically in a reciprocal motion between the lower position illustrated in FIG. 5 and an upper position in which the row of lifting devices 19 is located immediately beneath the lower edge of the conveyor belt 3. The lifting devices 19 are placed such that, when the conveyor 8 is idling, they can be displaced upwards between the carriers in the infeed conveyor 8 and shift the blanks to the registering compartments between the carriers 4 on the upper conveyor belt 3. Each individual lifting device 19 consists of a relatively thin plate whose upper edge is provided with a V-shaped recess which, during the transfer of the packaging container blanks, is disposed to cooperate with and cater for a certain preforming of the bottom panel of the packaging container blanks, as will be described in greater detail hereinbelow.

As was previously mentioned, the first workstation 16 also includes, in addition to the transfer portion, a bottom sealing portion which is placed slightly beneath the lower edge of the upper conveyor belt 3, i.e. in a space between the front parts (FIG. 6) of both of the conveyors 2 and 8. More precisely, the workstation 16 comprises mutually subsequent sealing jaws 21 and opposing counter jaws 22, counter jaws being movable in a direction towards and away from the sealing jaws 21 in a substantially horizontal plane. The sealing jaws 21 are of the ultrasonic type and, thus, are connected to one or more ultrasonic generators 23 (schematically illustrated). Like the counter jaws 22, the sealing jaws 21 are suspended in a movable parallel arrangement, which makes it possible, using a single drive motor 24, simultaneously to displace the jaws 21 and 22 in a direction towards one another so that the mutually facing work surfaces of the jaws meet in a centered position straight beneath a common, longitudinal center line for the compartments which are intended to accommodate the packaging container blanks and which are formed by the carriers 4 included in the active part of the conveyor belt 3. Hence, by means of the drive motor 24, the jaws 21 and 22 are groupwise displaceable between the above-mentioned position in which the work surfaces of the jaws are located in contact with one another via interjacent layers of the material of the packaging container blank, and the opposite end position which is illustrated in FIG. 3 where both groups of jaws 21 and 22 are located at maximum distance from one another so as to permit displacement of the conveyor belt 3 and the packaging container blanks located in its compartments.

As has been mentioned earlier, the second and third workstations, 17 and 18, are fundamentally identical to one another and are constructed in a manner similar to that of the workstation 16, apart from the fact that each one of the workstations 17 and 18 is only half as long as the workstation 16 seen in the direction of movement of the conveyor belt 3. Each one of the workstations 17 and 18 thus includes three sealing jaws 25 which are disposed on a common bridge, and one associated ultrasonic generator (not shown). Counter jaws 26 in each workstation 17, 18 are parallel-suspended in relation to the sealing jaws 25 so that the jaws 25, 26 are reciprocally displaceable towards and away from one another between the previously described active and passive end positions with the aid of drive motors 28.

Above each of the workstations 17 and 18, there are disposed three filler pipes for the supply of liquid contents to the packaging container blanks located in the workstations and supported by the carriers 4 of the conveyor belt 3. At their upper ends, the filler pipes 29 each connect to their metering pump 30 which, by the intermediary of conduits (not shown), is connected to a source of final contents, such as a tank.

Figure 6:
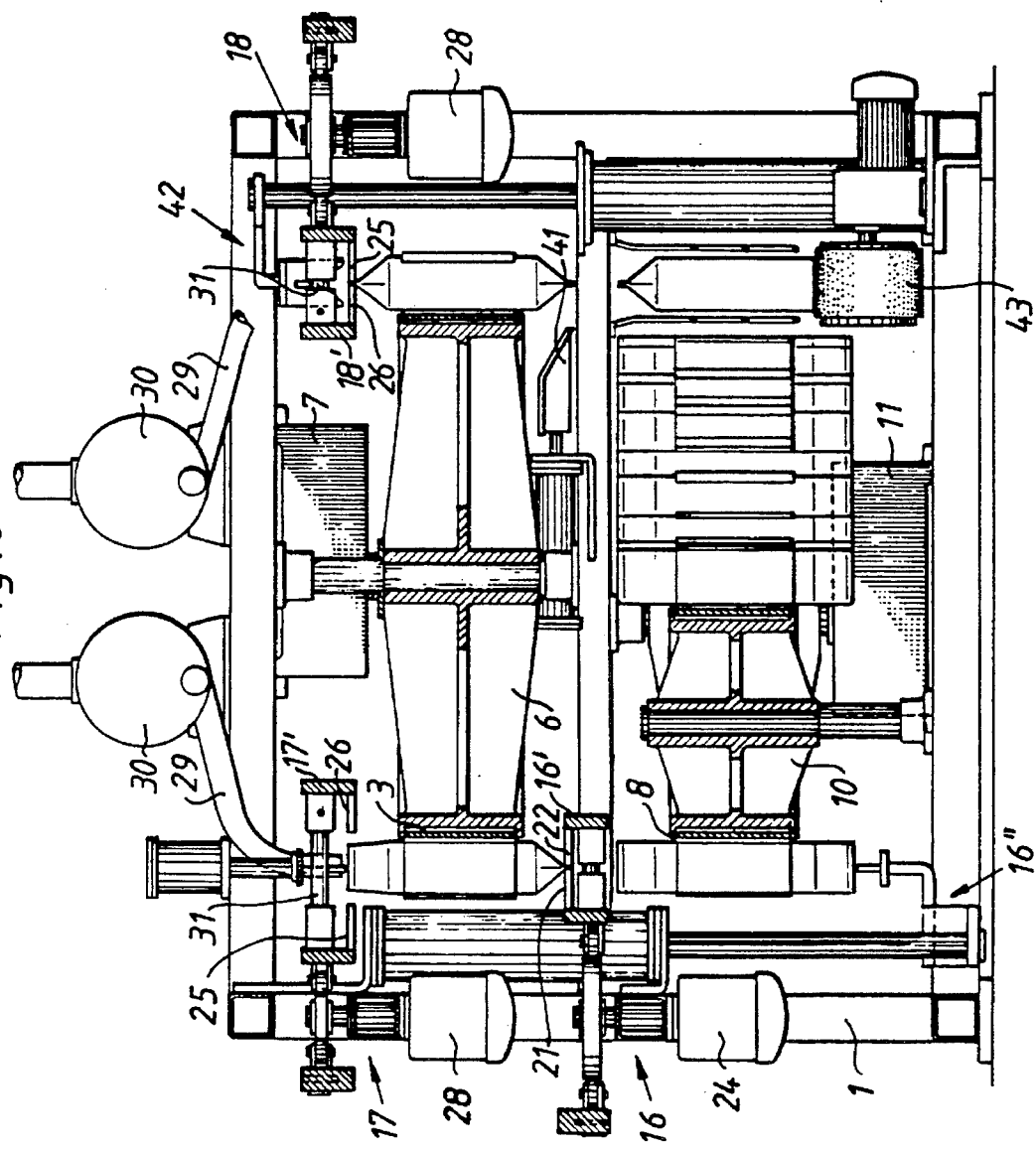
FIG. 6 is an end elevational view of a part of the machine.

The suspension and driving of the sealing and counter jaws 21, 25; 22, 26 of the different workstations is clearly apparent from FIG. 6 which is an end elevation of the packaging machine, all frame parts and other superfluous details having been removed. On either side of the centrally located wheel 6 can be seen the conveyor belt 3 provided with carriers, above which conveyor belt both of the metering pumps 30 with their filler pipes 29 are located. At the bottom to the left in FIG. 6 is shown the sealing portion 16' of the first workstation, and above this is located the sealing portion 17' of the second workstation. The sealing portion 18' of the mirror-reversed but identical workstation is disposed in register herewith but on the right-hand side of the wheel 6. It will be apparent from the Drawing figure how the sealing and counter jaws included in the sealing stations are located in register with one another, the mutually slidingly accommodating frame portions 31 (which are designed so as to make possible rectilinear displacement of the sealing jaw and associated ultrasonic generator and also to make possible the mutual parallel displacement) being illustrated only in part. It will be apparent from the above disclosures how all of the workstations, i.e. the closing and sealing stations as well as the filler stations, constitute separate machine modules provided with their own power and material supply, which can be replaced by other types of modules. Thus, for example the forming and sealing stations can be replaced by modules which make possible the manufacture of packaging containers displaying a different top or bottom design and construction, or alternatively displaying other dimensions. The synchronization of the different mutually cooperating stations is ensured by means of a common control unit. However, this is a per se well known technique which will not be dealt with in any detail in this context.

The placement of the processing stations at both parts or runs of the main conveyor is a space-saver and ensures a compact overall design and construction, like the employment of two mutually superposed conveyors. A further contribution in space efficiency is also made by the combined function, provided by the workstation 16, of transfer, forming and sealing station, as well as the combined filling and top-sealing stations 17, 18.

Figure 7:
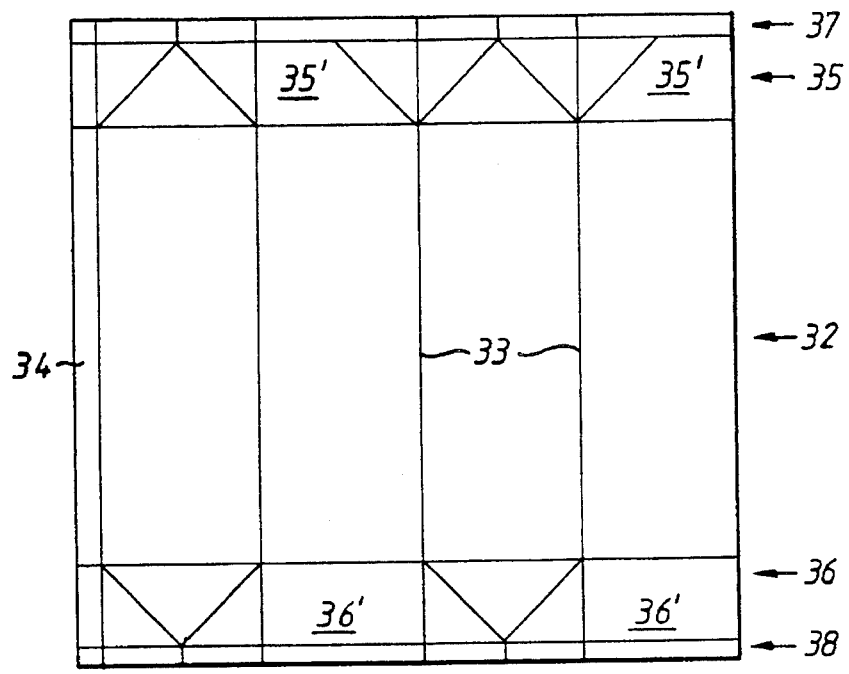
FIG. 7 is a plan view of one blank for a type of packaging container which may be produced using the packaging machine according to the present invention.
Figure 8A:
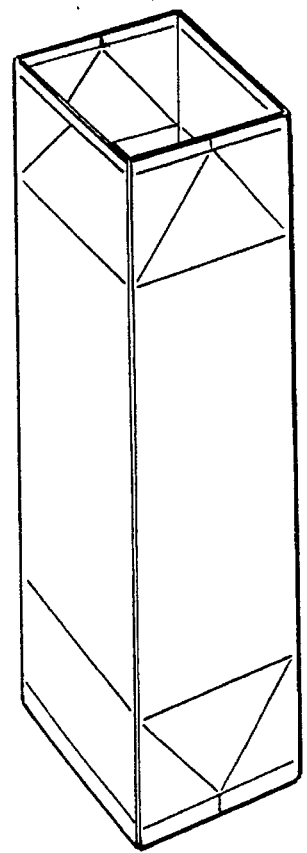
FIGS. 8 A, B and C show, in perspective views, the stepwise reforming of a packaging container blank according to FIG. 7 into finished, filled packaging containers using the packaging machine according to the present invention.
Figure 8B:
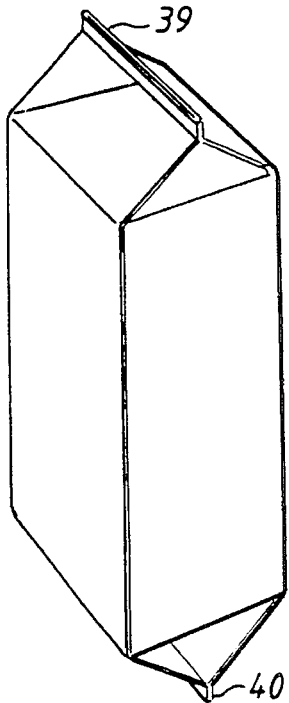
Figure 8C:
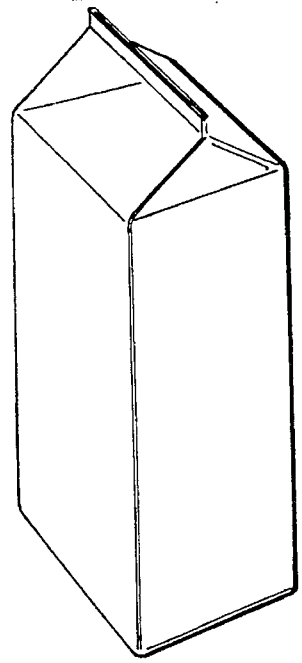

Those packaging containers which are intended for production using the packaging machine according to the present invention are essentially of conventional type and are illustrated in FIGS. 7 and 8. The packaging containers are fed to the packaging machine in the form of packaging container blanks of tubular, quadratic cross section which are manufactured from individual blanks of the type shown in FIG. 7. Each blank consists of a packaging material with at least one external layer of thermoplastic and comprises four mutually laterally located side wall panels 32 which are separated by means of mutually parallel vertical crease lines 33. At the one end of the blank, there is an additional, relatively narrow sealing panel 34 which, after tubular forming of the blank, is connected by means of heat-sealing to the free edge of the side wall panel 32 located at the opposite end of the blank. At the upper and lower ends of the side panels, there are provided a number of fundamentally identical top and bottom panels 35 and 36, respectively, which alternatingly include quadratic and triangular narrow panels for forming, in a known manner, a so-called gable top end seal which, at its free end, may be sealed together in a liquid tight manner with the aid of top and bottom sealing panels 37 and 38, respectively. In such instance, two sealing fins 39 and 40 are formed at both ends of the packaging container. The lowermost of these fins is downwardly folded under simultaneous compression of the gable top forming bottom panels 36 so that the packaging container obtains a substantially planar bottom. The packaging container blanks are reformed stepwise with the aid of the packaging machine according to the present invention, which will now be described in greater detail.

When the machine according to the present invention is in operation for manufacturing, from prefabricated packaging container blanks of the type illustrated in FIG. 8 A, filled and sealed packaging containers of the type illustrated in FIG. 8 C, the flat-laid packaging container blanks are supplied at the left hand end of the machine (FIGS. 3, 5), where the blanks are placed in the previously mentioned magazine 15 whose outlet end discharges immediately adjacent the infeed wheel 12. As is described in greater detail in the above-mentioned European Patent Application No. 90311570.7, the infeed wheel 12 is provided with a number of gripping arms which, when the infeed wheel 12 is rotated counter-clockwise, grip one flat-laid packaging container blank at a time and take it from the magazine. With the aid of the arms of the infeed wheel 12, folding and raising of each individual packaging container blank take place at the same time so that the blank, after substantially half of a revolution of the infeed wheel 12 in the raised state, reaches the initial end of the infeed conveyor 8 where each packaging container blank is placed between two of the carriers of the infeed conveyor 8. Since the infeed wheel 12 is placed immediately adjacent that part of the infeed conveyor 8 which runs about the wheel 9, the carriers of the infeed conveyor 8 are in a diverging or "open" state, which greatly facilitates placing of each individual packaging container blank between the carriers, as is clearly illustrated in FIG. 3. In order to prevent the packaging container blanks placed in the infeed conveyor 8 from falling out of the compartments between the carriers located in the open state, there are a number of guides which, in a conventional manner, extend along the path of movement of the infeed conveyor.

In the illustrated embodiment of the packaging machine according to the present invention, the infeed wheel 12 has six carriers which are located at the periphery of the wheel within an angle of approx. 250°. This entails that the infeed wheel 12 will, on continuous rotation, intermittently transfer groups of six packaging container blanks to six mutually subsequently located compartments between the carriers of the infeed conveyor 8. During operation, the infeed conveyor 8 is also displaced intermittently in a clockwise direction, in which event the movement of the infeed conveyor 8 is synchronized with the movement of the infeed wheel 12 so that the infeed conveyor moves simultaneously as the packaging container blanks are transferred thereto. The infeed conveyor 8 thereafter stops in order, when the infeed wheel 12 has rotated to the next infeed phase, once again to be accelerated so as to receive the subsequent group of six packaging container blanks. Since the infeed conveyor must be permitted a certain acceleration and retardation travel distance, the different groups will be located with one empty compartment between each group.

The intermittent clockwise movement of the infeed conveyor 8 will duly transfer an infeed group of packaging container blanks to that part of the path of the infeed conveyor which runs parallel with and immediately beneath the right-hand end, or first part, (FIG. 3, FIG. 5) of the main conveyor 2. The main conveyor 2 also moves intermittently, each displacement corresponding to the length of one group of packaging container blanks plus interjacent empty compartments for acceleration and retardation. As will be described later, the compartments of the conveyor will, in the position of rest of the main conveyor 2, coincide with the work positions at each respective workstation, and the position of rest of the main conveyor 2 moreover coincides with the position of rest of the infeed conveyor 8, so that the compartments of the conveyor for one group of packaging containers will arrive in register (above) with one another, whereby it is possible when conveyors are idling, unimpeded to transfer packaging container blanks by being displaced upwards vertically from the infeed conveyor 8 to the main conveyor 2. This takes place in workstation 16.

When the infeed conveyor has displaced one group of packaging container blanks to workstation 16, the transfer portion 16" is first activated with the transfer bridge 20, whose V-shaped lifting devices 19 are displaced vertically upwards each in their compartment in the infeed conveyor 8.

In such instance, the lifting devices 19 come into contact with the lower end of the tubular packaging container blanks, whereupon the V-shaped edges of each lifting device 19 come into contact with the bottom panels 36 which are divided into triangular refold panels, as well as the bottom sealing panel 38 which is provided with weakening vertical crease lines and is disposed at the edge of the packaging container blank. As a result of this arrangement, a certain prefolding will take place, on vertical displacement of the packaging container blanks from the infeed conveyor 8 to the main conveyor 2, of the bottom panel 36 of the packaging container blanks so that the triangular refold panels are displaced towards one another at the same time as the unbroken bottom main panels 36' are collapsed in a direction towards one another which, however, is a known forming procedure employed in this type of packaging container and, consequently, is unlikely to need any detailed description here.

When the vertical displacement of the packaging container blanks approaches its end, the top panel 35 of the packaging container blanks is acted on by means of vertically movable prefolding devices 41 whose parts coming into contact with the packaging container blanks are of similar design to the lifting devices 19 with V-shaped but downwardly facing recesses which act on the triangular top panels so that the top of the packaging container blank is also subjected to a prefolding with mutually sloping top main panels 35'. After prefolding of both bottom and top panels, the lifting devices 19 (as well as the prefolding devices 41) are returned to their inactive position spaced apart from the upper region of the main conveyor 2 and the lower region of the infeed conveyor 8, respectively, in which event the conveyors and the packaging container blanks located therein may freely be displaced.

When the group of packaging container blanks in workstation 16 has been completely displaced from the infeed conveyor 8 to corresponding compartments between the carriers 4 on the main conveyor, all will be located in the same vertical position, in which the lower, horizontal bottom sealing panels 38 of the packaging container blanks will be located outside the end edges of the carriers and substantially in register with the work surfaces of the sealing jaws 21 and the counter jaws 22. The bottom sealing portion 16' is now acted on so that the sealing jaws 21 and the counter jaws 22 are displaced in parallel in a direction towards one another, in which event their work surfaces come into contact with the sealing panels 38 of the packaging container blanks and urge them towards one another during simultaneous ultrasonic sealing. The triangular bottom panels (which were inwardly folded in the previously described preforming) are presealed in inwardly folded mutually facing positions between the mutually inclining bottom main panels 36' so that the packaging container blank will have a bottom configuration of the "gable top-like" type, as is illustrated at the lower end of the packaging container blank illustrated in FIG. 8B. After completed sealing, the sealing jaws 21 and counter jaws 22 are returned to the inactive position illustrated in FIG. 3. The main conveyor 2 may now displace the packaging container blanks which have been provided with liquid-tight bottom seal to the next workstation.

The subsequent workstations seen in the direction of movement of the main conveyor are the two filling and top-sealing stations 17 and 18 which, as has been mentioned earlier, are mutually identical. Each one of the two workstations 17 and 18 is intended to handle half of that group of packaging containers which departed from the workstation 16, i.e. in the illustrated embodiment, the six packaging containers included in the group will be divided into two subgroups so that the first three packaging containers seen in the direction of movement will be allocated to filling and top-sealing station 18, while the three rear packaging containers will be allocated to filling and top-sealing station 17. Of course, this does not take place on the same movement of the main conveyor 2, but a plurality of groups infeed in sequence will always be intermittently displaced round the path of the main conveyor 2—this, however, being taken for granted and not described in any detail in this context. The three packaging containers which, with the aid of the main conveyor 2, reach the filling and top-sealing station 17 (or alternatively station 18) arrive, when the conveyor 2 has stopped straight beneath the filler pipes 29 of the metering pump 30 and, with the aid of lifting devices (not shown), the three packaging containers are moved vertically upwards until their upper open ends surround the filler pipes, whereafter filling is commenced so that a metered quantity of contents flows out via the lower ends of the filler pipes 29 and down into the packaging containers, at the same time as these are once again lowered at the same rate as the filling cycle, such that unnecessary splashing or frothing is avoided. The method of placing the packaging container around the filler pipe and thereafter lowering it at the same rate as the filling cycle is well known per se and is employed in many types of packaging machines.

Figure 4:
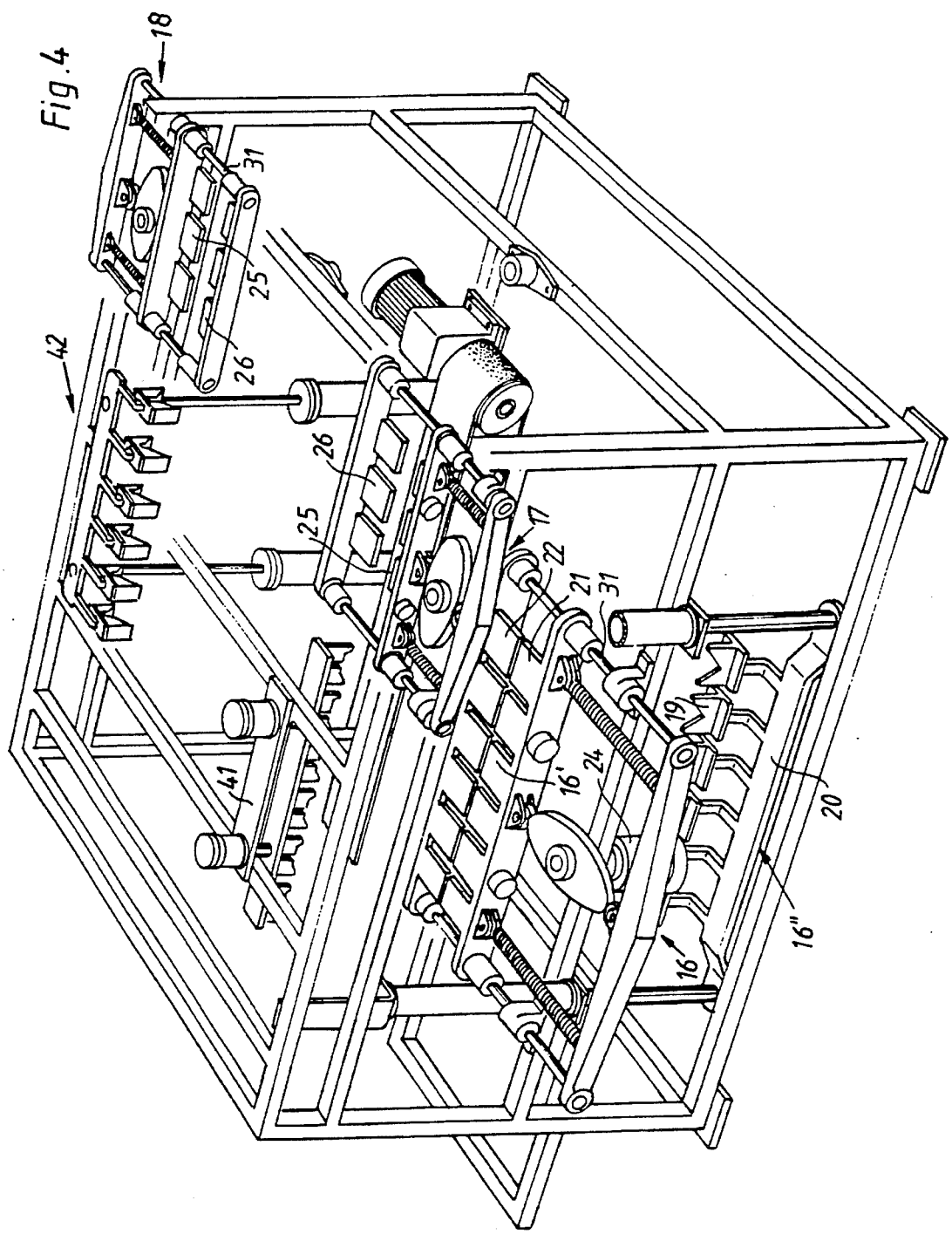
FIG. 4 is a perspective view similar to that of FIG. 1 but with further details removed so as clearly to illustrate the design and placement of the package processing parts of the machine.

When the filling cycle has been completed, the three packaging containers will once again be located in the recesses of the main conveyor 2 defined by the T-shaped carriers 4 and, more precisely, in such a vertical position that the upper top panel 35 of the packaging containers extends above the upper edge of the conveyor 2. In this position, folding together of the top panels 35 takes place, together with sealing of the upper end of the packaging containers filled to the desired level. This sealing is effected in that the sealing and counter jaws 25, 26 located at the filling and top-sealing station are, by means of the associated drive motor 28, displaced in parallel towards one another so that the two top main panels 35' are collapsed towards one another on either side of the triangular infold panels, whereafter the work surface of the sealing jaw 25 is brought into contact with the top sealing panel 37 of the top panel 35 in order, together with the counter jaw 26, to ultrasonically seal this panel for the formation of a liquid-tight top seal. The sealing jaw 25 and the counter jaw 26 are thereafter displaced in parallel away from one another to the position of rest illustrated, for example, in FIG. 4.

Subsequent intermittent displacements of the main conveyor 2 will duly move the entirely sealed packaging containers filled with the desired quantity of contents to the region after the second filling and top-sealing station 18. In order to cater for a final folding of the bottom sealing fin 40 projecting at the bottom end of the packaging container so that the bottom configuration of the package is changed from that illustrated in FIG. 8B to the wholly planar bottom which is illustrated in FIG. 8 C, the sealing fin 40 of the packaging container is, on displacement of the main conveyor 2, brought into contact with a guide running at an angle to the longitudinal direction of the main conveyor, the guide being located immediately beneath the main conveyor and progressively acting on the sealing fin 40 so that this is folded to the side. With the aid of additional guides or a reciprocating pressure and sealing device 41, the gable top-shaped bottom is thereafter reformed into a substantially planar bottom whose different parts are held together in the desired planar state by heat-sealing. Hereafter, the finished packaging containers are removed from the compartments of the main conveyor by means of a discharge device 42 which, for example by means of a pneumatically or electrically driven tool acting on the tops of the packaging containers, displaces the packaging containers axially downwards so that they may be transported further upright on an endless conveyor belt 43, or employing some other known method.

Since each work and processing station (together with its associated electric or pneumatic power source) forms a separate module, both the number and function thereof may be varied within broad limits. This makes for a compact machine in which both parts of the conveyor may be efficiently utilized. Naturally, the division into an infeed and a main conveyor placed on different planes also contributes in the degree of compactness. The design and construction of the two workstations 17 and 18 as combined filler and sealing stations also contributes in increasing the workrate of the machine, since the upper parts of the packaging container are sealed in a liquid-tight manner immediately after the filling operation. In prior art machines, filling and sealing take place in separate stations with a horizontal transport distance between the stations, and the packaging containers must cover this distance at slow and uniform speed in order to avoid spillage.

The illustrated packaging container type is suitable for forming, filling and sealing in the pertinent packaging machine, but naturally other container types may also be manufactured. As a result of the modular system of the machine, top or bottom sealing can, for example, readily be put into effect in different ways. For example, the one or both ends of the blank may lack the integrated top and bottom panels, respectively, and instead be provided with separately applied bottoms and tops of any optional configuration, for example a prefabricated top portion with pouring spout and reclosure arrangement.

The present invention should not be considered as restricted to that described above and shown on the Drawings, many modifications being conceivable without departing from the spirit and scope of the appended claims.

What is claimed is:

1. A packaging machine for manufacturing filled and sealed packaging containers, comprising an endless main conveyor movable in a direction of movement, a plurality of workstations disposed along the conveyor, at least two of said workstations being in the form of replaceable machine modules, each of said at least two modules being drivable by way of an associated motor with the motors of the different modules being controlled by a common control unit, an infeed conveyor extending partly in parallel with the main conveyor for conveying packaging container blanks formed into tubes that are to be transferred to the main conveyor, said plurality of workstations including a first station located at mutually parallel sections of the main and infeed conveyors for transferring and end-sealing a first group of packaging container blanks formed into tubes, the first station including a sealing device for sealing an end of the packaging container blanks formed into tubes, the first station also including reciprocal displacing devices disposed to displace the packaging container blanks formed into tubes from the infeed conveyor to the main conveyor.

2. The machine as claimed in claim 1, wherein said plurality of workstations includes a second station for filling and top-sealing at least a portion of the first group of packaging container blanks formed into tubes.

3. The machine as claimed in claim 1, wherein both the main conveyor and the infeed conveyor are divided into compartments.

4. The machine as claimed in claim 1, wherein said plurality of workstations includes a second station which is filling and top-sealing station, the second station being located above the main conveyor to seal an opposite end of the packaging container blanks formed into tubes after filling.

5. The machine as claimed in claim 2, wherein the main conveyor has a first part along which said first station is located and disposed to simultaneously process the first group of packaging container blanks formed into tubes, said second station being disposed along the first part of the main conveyor, the machine including, along a second part of the main conveyor, another second station for filling and sealing the remaining packaging container blanks formed into tubes included in said first group.

6. The machine as claimed in claim 3, wherein said plurality of workstations includes a second station which is a filling and top-sealing station, the second station being located above the main conveyor to seal opposite end of the packaging container blanks formed into tubes after filling.

7. The machine as claimed in claim 3, wherein the sealing device of said first station is located immediately beneath the main conveyor and is disposed to seal end portions of the packaging container blanks formed into tubes which extend outside the compartments of the main conveyor.

8. The machine as claimed in claim 4, wherein said second station includes a sealing device for sealing the opposite end of the packaging container blanks formed into tubes and a filling device for filling the packaging container blanks formed into tubes, the sealing device and filling device of the second station being located at the same place along the main conveyor.

9. The machine as claimed in claim 5, wherein each one of the two filling and top-sealing stations has a capacity which is half of the capacity of the first station.

10. The machine as claimed in claim 8, wherein the filling device of the second station includes filler pipes which are located above the sealing device of the second station.

11. A machine for manufacturing filled and sealed packaging containers from packaging container blanks, comprising an endless conveyor having individual receiving areas for individually receiving packaging container blanks formed into tubes having a bottom end and a top end and for advancing the packaging container blanks formed into tubes along a transport path in a transport direction, a bottom-sealing station located along the transport path for simultaneously sealing the bottom ends of a first group of the packaging container blanks formed into tubes to form a first group of bottom-sealed packaging containers, a first filling and top-sealing station located along the transport path downstream of the bottom° sealing station for filling simultaneously one portion of said first group of bottom-sealed packaging containers and for sealing simultaneously the top ends of the one portion of said first group of packaging containers, a second filling and top-sealing station located along the transport path downstream of the first filling and top-sealing station for filling simultaneously another portion of said first group of bottom-sealed packaging containers and for sealing simultaneously the top ends of the another portion of said first group of bottom-sealed packaging containers, an infeed conveyor located below the endless conveyor for conveying packaging container blanks formed into tubes that are to be transferred to the endless conveyor, and a transfer device located along the transport path for transferring packaging container blanks formed into tubes from the infeed conveyor to the individual receiving areas on the endless conveyor.

12. The machine as claimed in claim 11, wherein the infeed conveyor is positioned substantially parallel to the endless conveyor and includes individual compartments for individually receiving packaging container blanks formed into tubes, said transfer device including a plurality of reciprocating lifting devices that lift the packaging container blanks formed into from the individual compartments on the infeed conveyor to the individual receiving areas on the endless conveyor.

13. The machine as claimed in claim 11, wherein the first filling and top-sealing station fills and top-seals one-half of the first group of bottom-sealed packaging containers, and the second filling and top-sealing station fills and top-seals one-half of the first group of bottom-sealed packaging containers.

* * * * *